United States Patent
Bonnet et al.

(10) Patent No.: US 6,707,854 B1
(45) Date of Patent: Mar. 16, 2004

(54) METHOD OF GLOBAL MOTION ESTIMATION BETWEEN CONSECUTIVE VIDEO PICTURES

(75) Inventors: Michel Bonnet, Paris (FR); Cécile Dufour, Paris (FR)

(73) Assignee: Koninklijke Philips Electronics N.V., Eindhoven (NL)

(*) Notice: Subject to any disclaimer, the term of this patent is extended or adjusted under 35 U.S.C. 154(b) by 520 days.

(21) Appl. No.: 09/663,668

(22) Filed: Sep. 18, 2000

(30) Foreign Application Priority Data

Sep. 21, 1999 (EP) .............................. 99402310

(51) Int. Cl.[7] .............................. H04B 1/66; H04N 7/13; H04N 7/32
(52) U.S. Cl. .................................. 375/240.16
(58) Field of Search .................. 375/240.01, 240.15, 375/240.16, 240.17; 382/276, 103, 294; H04N 7/13, 7/32; H04B 7/66

(56) References Cited

U.S. PATENT DOCUMENTS

| | | | | |
|---|---|---|---|---|
| 5,611,000 A | * | 3/1997 | Szeliski et al. | 382/294 |
| 6,496,606 B1 | * | 12/2002 | Boutroux et al. | 382/276 |
| 6,529,613 B1 | * | 3/2003 | Astle | 382/103 |

FOREIGN PATENT DOCUMENTS

| | | | | |
|---|---|---|---|---|
| EP | 0614318 A3 | 9/1994 | ............ | H04N/7/13 |
| EP | 0614318 A2 | 9/1994 | ............ | H04N/7/13 |
| EP | 0797357 A2 | 9/1997 | ............ | H04N/7/26 |
| EP | 0797357 A3 | 9/1997 | ............ | H04N/7/36 |
| WO | WO9859497 | 12/1998 | ............ | H04N/7/32 |

OTHER PUBLICATIONS

Dufaux, F. et al.; Effient, rebust, and fast global motion estimation for video coding, Image processing, IEEE Transactions on, vol.: 9 Issue: Mar. 3, 2000, pp. 497–501.*
Soo Chang Pei et al., Global estimation in model–based image coding by tracking three–dimensional contour points, Circuits and Systems for Video Technology, IEEE Transactions on, vol.: 8 Issue: Apr. 2, 1998, pp. 181–190.*
Sull, S. et al. , Estimation of motion and structure of plannar surfaces from a sequence of monocular images, Computer Vision and Pattern Recognitioin 1991. Proceedings CVPR'91., IEEE Computer Society Conference on, Jun. 3–6, 1991, pp. 732–733.*

* cited by examiner

*Primary Examiner*—Chris Kelley
*Assistant Examiner*—Tung T. Vo

(57) ABSTRACT

A global motion estimation method between an incoming frame F(n) of a sequence of frames and a large static image M(n−1), which is constructed from previous frames F(1), F(2), . . . , F(n−1) of the video sequence, uses a motion model based on a two-dimensional perspective transform that contains eight motion parameters. The eight motion parameters are the coordinates of the four vertices of the incoming frame. The motion estimation method enables any displacement of the four corners of the original rectangular image to fit the next one by optimizing a cost function.

Useful applications include those related to MPEG-4 and, more especially, to MPEG-7 standard, such as sprite generation or mosaicing.

9 Claims, 2 Drawing Sheets

METHOD OF GLOBAL MOTION ESTIMATION BETWEEN CONSECUTIVE VIDEO PICTURES

FIELD OF THE INVENTION

The present invention relates to a method and its corresponding device for stimating motion between an incoming frame F(n) of a sequence of frames and a large static image M(n−1), said large static image being constructed from previous frames F(1) . . . F(n−1) of said sequence, said motion estimation method using a motion model based on a two-dimensional perspective transform containing eight motion parameters and comprising an optimization step of a cost function.

Such an invention can be useful for applications related to MPEG-4 and, more especially, to MPEG-7 standard, such as sprite generation or mosaicing.

BACKGROUND OF THE INVENTION

A method of the above kind is known from the patent application WO 98/59497. This patent application describes a method used in video coding for generating a sprite from the video objects in the frame of a video sequence. The method estimates the global motion between a video object in a current frame and a sprite constructed from video objects for previous frames. Specifically, the global motion estimation method computes motion coefficients of a two-dimensional transform that minimizes the intensity errors between pixels in the video object and corresponding pixels in the sprite. The Levenberg-Marquardt method is employed for the minimizing step, which consists in the minimization of an analytical function related to the intensity errors, and allows to select the most representative points and reject the others as outliers.

Nevertheless, the previously described global motion estimation method has several drawbacks. The major one is that it is very sensitive to outliers, which are pixels that do not follow the global motion and corresponds to objects having their own motion. It means that the global motion estimation method can sometimes fail with some particular video sequences. Another drawback is also its inability to converge efficiently and fast for certain kind of video sequences.

SUMMARY OF THE INVENTION

It is therefore an object of the present invention to propose another global motion estimation method that is very robust to outliers but that can also allow an efficient and fast convergence.

To this end, the method according to the invention is characterized in that the eight motion parameters are the coordinates of the four vertices of the incoming frame, said vertices being successively moved in two directions to find an estimation of the motion parameters corresponding to an optimum of the cost function.

The motion estimation method is based on a geometrical approach that treats successively and iteratively the eight motion parameters by optimizing a numerical function whereas the approach of the background art, based on the Levenberg-Marquardt algorithm, treats the eight motion parameters simultaneously by minimizing an analytical function. As a consequence, the motion estimation method based on the displacement of the four vertices has proved to be more robust to outliers than the one used in the background art.

The method according to the invention is also characterized in that the motion estimation method includes a first iterative method that comprises, at each iteration, the optimization step to determine an estimation of the eight motion parameters, followed by a step of calculation of the two directions of motion of each of the four vertices by taking into account the last deformation, said iterative method being performed until a defined criteria is reached.

The iterative method is based on the Powell's algorithm that improves the convergence of said method.

The method according to the invention is finally characterized in that the optimization step comprises a second iterative method performing, at each iteration, a parabolic interpolation operation of values of the cost function to estimate successively the motion parameters.

The use of a parabolic interpolation operation makes the convergence of the motion estimation method faster, especially in the case of large motion.

As a consequence, the present motion estimation method could be advantageously included in a method for generating a large static image, such as a sprite or a mosaic, and implemented in a device for generating such a large static image.

These and other aspects of the invention will be apparent from and elucidated with reference to the embodiments described hereinafter.

BRIEF DESCRIPTION OF THE DRAWINGS

The present invention will now be described, by way of example, with reference to the accompanying drawings, wherein.

DESCRIPTION OF THE INVENTION

The present invention proposes a new global motion estimation method between an incoming frame F(n) of a sequence of frames and a large static image M(n−1), which is constructed from previous frames F(1), F(2), . . . , F(n−1) of the video sequence.

Figure 1:
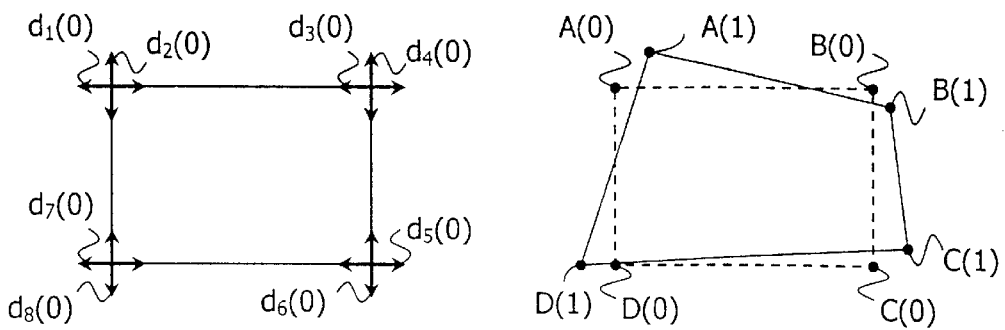
FIG. 1 shows a geometrical representation of the optimization step for the first iteration.

The principle of the motion estimation method is depicted in FIG. 1. Said motion estimation method uses a motion model based on a two-dimensional perspective transform, which is also called the perspective model, in order to characterize the motion between two frames. This model contains eight motion parameters and is preferably chosen because it allows more camera motion possibilities than the other ones, such as, for example, translation, zoom, or rotation. The use of the perspective model is valid in the two following cases:

All views share the same optical center. This is more or less the case when a camera is fixed to a rotating tripod: the rotation axis may pass through or very near the optical center of the camera. If the captured objects are very far from the camera, this assumption is always verified.

The captured scene corresponds to a flat surface.

A perspective projection transforms a rectangle into a quadrilateral. The two-dimensional coordinates of the four vertices of the quadrilateral completely define the eight motion parameters $a_0$ to $a_7$ of the perspective projection. Thus, the eight motion parameters are, in the present invention, the two-dimensional coordinates of the four vertices, which are at the beginning of the process $A(0)$ $(a_0(0), a_1(0))$, $B(0)$ $(a_2(0), a_3(0))$, $C(0)$ $(a_4(0), a_5(0))$ and $D(0)$ $(a_6(0), a_7(0))$.

The motion estimation method according to the invention enables any displacement of the four corners of the original rectangular image to fit the next one by optimizing a cost function. Starting from an initial position for these four vertices, corresponding to an initial set of motion parameters, the method tries to optimize the cost function by slight displacements of the four vertices. Each vertex is displaced by a small amount around its initial position in order to find a local optimum for the cost function. For example, $A(0)$ is moved along the direction $d_1(0)$, which is in this particular case an horizontal direction, in order to find an optimum of the cost function. Then, the obtained point is moved along the direction $d_2(0)$, which is in this particular case a vertical direction, until another optimum is found giving a new vertex $A(1)$ $(a_0(1), a_1(1))$. This operation is then performed successively for the other vertices and a new quadrilateral image is obtained.

In the preferred embodiment the cost function is related to the Displaced Frame Difference (DFD). The DFD measurement is computed on the pixels belonging to the area S overlapping both incoming frame $F(n)$ and current large static image $M(n-1)$ as follows:

$$DFD = \sum_S r_p^2$$

where $r_p$ is a difference between original and predicted values of a pixel p defined as follows:

$$r_p = L(x,y) - L(x',y')$$

where:
- $L(x,y)$ is the luminance value of the video signal corresponding to the pixel $p(x,y)$ of the incoming frame $F(n)$,
- $L(x',y')$ is the luminance value of the video signal corresponding to the pixel $p'(x',y')$ of the large static image $M(n-1)$.
- $(x',y')$ are the floating point value of the pixel p' to be extracted from the large static image. The value of the luminance corresponding to this pixel is calculated with respect to the four closest integer coordinates in the image, which are $(x_0,y_0)$, $(x_1,y_1)$, $(x_2,y_2)$, $(x_3,y_3)$ with respective luminance values L0, L1, L2 and L3, using a bilinear interpolation:

$$L(x',y') = L0 + (x'-x_0)(L1-L0) + (y'-y_0)(L2-L0) + (x'-x_0)(y'-y_0)(L3-L2-L1+L0)$$

The optimization of the cost function is, in this case, a minimization of the displaced frame difference. The DFD is here calculated with the luminance values of the video signals but can also be calculated with the chrominance values of the video signals.

In another embodiment, the cost function is related to the Displaced Frame Correlation (DFC). The DFC measurement is computed on the pixels belonging to the area S overlapping both incoming frame $F(n)$ and current large static image $M(n-1)$ as follows:

$$DFC = \frac{\sum_S L(x,y)L(x',y')}{\sqrt{\sum_S L(x,y)^2 L(x',y')^2}}.$$

The optimization of the cost function is, in this case, a maximization of the displaced frame correlation. The DFD is here calculated with the luminance values of the video signals but can also be calculated with the chrominance values of the video signals.

The motion estimation method according to the invention comprises two main steps:

A first step is performed to initialize the motion parameters automatically for the two first frames.

During a second step, each motion parameter is independently optimized, by minimizing a cost function related to the DFD. This cost function cost( ) is, in the preferred embodiment, a weighted mean square error defined as follows:

$$cost(r_p) = \sum_p \frac{1}{2} w_p r_p^2$$

where $w_p$ is a weighting coefficient, which is defined as follows:

$$w_p = \frac{1}{r_p} \frac{d}{dr_p} \rho(r_p)$$

where $\rho$ is a symmetric, positive-definite function with a unique maximum at $r_p=0$.

The $\rho$ function is chosen in order to reduce the influence of outliers. In the preferred embodiment, the $\rho$ function is a lorentzian function defined as follows:

$$\rho(r_p, \sigma) = \log\left[1 + \frac{1}{2}\left(\frac{r_p}{\sigma}\right)^2\right]$$

where $\sigma$ is a scale factor.

Other $\rho$ functions can be suitable for the present invention such as, for example, the German and McClure function, which is defined as follows:

$$\rho(r_p, \sigma) = \frac{r_p^2}{\sigma + r_p^2}.$$

In a second embodiment, the cost function is another weighted mean square error, taking into account an information on the gradient of a pixel p ($grad_p$) as follows:

$$cost(r_p) = \frac{\sum_{p/(grad_p \geq T)} w_p r_p^2}{\sum_{p/(grad_p \geq T)} w_p}$$

where T is a threshold close to zero and where the weighting coefficient $w_p$ is defined as follows:

$$w_p = \frac{2}{2 + \frac{r_p^2}{1 + grad_p^2 \sigma^2}}$$

In this second embodiment, the weighting coefficient $w_p$ of the mean square error is normalized by dividing it by the sum of all the weights at each pixel location to favor small displacements with small errors rather than large displacements with large errors. Moreover, the introduction of a gradient information allows to:

give more importance to regions where the gradient is higher than the threshold T, these regions being more appropriate for matching purposes, discard regions where the gradient is below the threshold T, thus enabling to increase the speed of the cost estimation.

Figure 2:
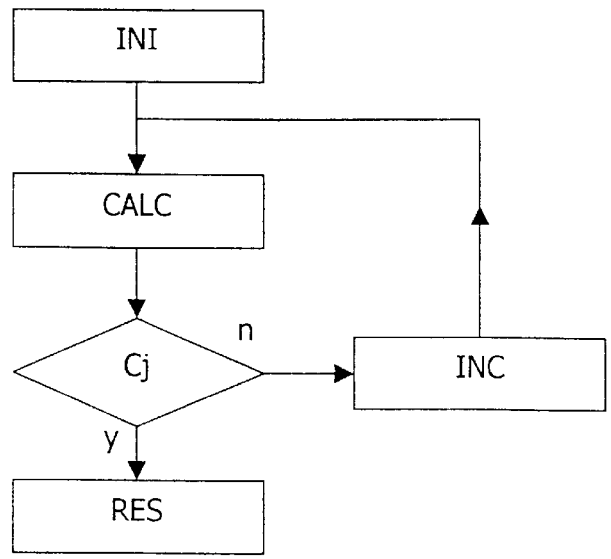
FIG. 2 is a flowchart for the process used to perform the automatic initialization of the motion parameters for the two first pictures.

FIG. 2 is a flowchart showing the method used to perform the automatic initialization of the motion parameters for the two first frames.

In the preferred embodiment, a translation transform, which needs only two motion parameters, is used in order to get a first approximation of the displacements between the two first frames of the video sequence, where no prediction is available.

The automatic initialization step comprises:

an initialization sub-step (INI) of the pixel position xx_min corresponding to the minimum of the cost function in an horizontal direction: xx_min=0, a calculation sub-step (CALC) of the value j of the pixel position corresponding to the minimum of the cost function cost( ) when applying translations on the incoming frame in an horizontal direction, the amplitude i of the translation vector being comprised between −5 and +5 pixels:
j=Argmin[cost(xx_min+i)]
−5≦i≦5, where Argmin is the function that returns the abscissa corresponding to the minimum of the cost function, giving here the displacement between the two frames for the considered direction, a test (Cj) on the value of j, if the test is not satisfied (j is not equal to zero), a sub-step of re-calculation (INC) of the value xx_min: xx_min= xx_min+j, if the test is satisfied (J=0), the end of the process (RES) giving the final translation xx_min in the horizontal direction.

The same algorithm is applied in the vertical direction in order to find the translation yy_min to be performed.

Figure 3:
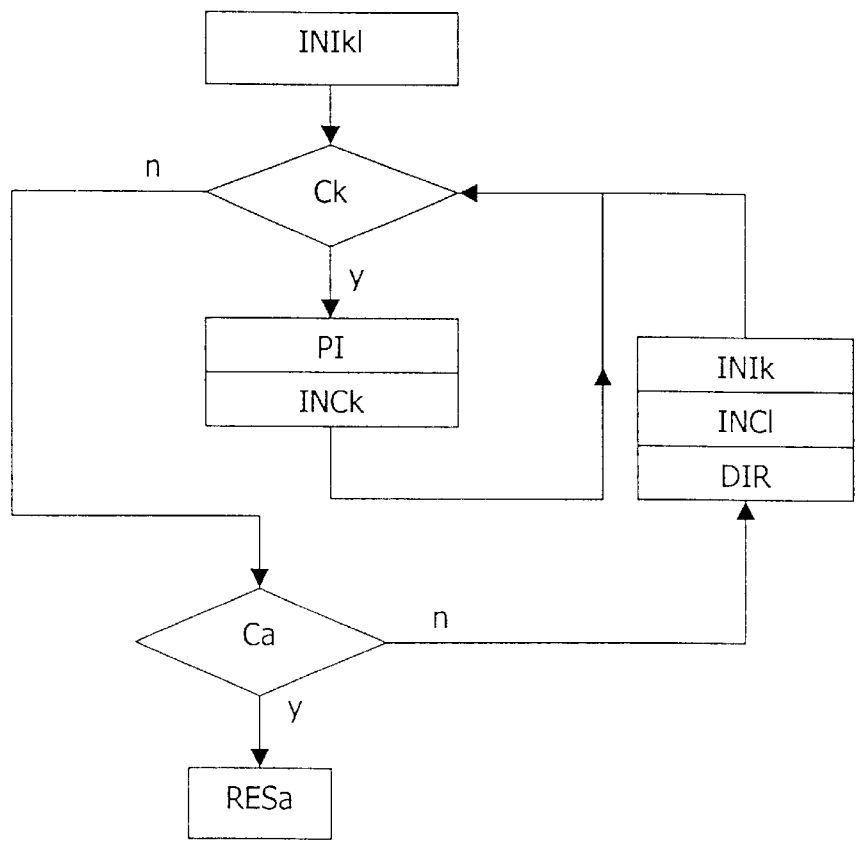
FIG. 3 is a flowchart for the iterative process used to optimize the motion parameters.

FIG. 3 is a flowchart showing the iterative process used to optimize the motion parameters. This method is based on Powell's convergence method.

The set of eight motion parameters, corresponding to the coordinates of the four vertices, is initialized to values given by the prediction of global motion, in $a_k(0)$ with $0 \leq k \leq 7$.

The step of optimization of the motion parameters comprises:

an initialization sub-step (INIkl) of k and of a counter l: k=l=0, a test (Ck) on the value of k, if the value of k is strictly lower than 8 (y), a sub-step of calculation (PI) of the value of the motion parameter $a_k(l+1)$, which corresponds to a minimum of the cost function cost( ):

$a_k(l+1)$=Argmin[cost($a_k(l)+i$)]
i∈ℜ, followed by a sub-step of incrementation by one of k (INCk), in the contrary case (n), a second test (Ca) on the maximum M, for the different values of k, of the absolute value of the difference between $a_k(l+1)$ and $a_k(l)$:

$$M = \max_k(|a_k(l+1) - a_k(l)|),$$

if the value of M is inferior to a threshold (y), the end of the process (RESa) giving the values of $a_k(l+1)$, in the contrary case (n), a sub-step of computation of new directions of minimization (DIR), followed by a sub-step of incrementation by one of l (INCl) and a sub-step of re-initialization of k (INIk).

The sub-step of calculation (PI) of the value $a_k(l+1)$ is performed using parabolic interpolations. A first parabolic interpolation is performed on the values of the cost function corresponding to three consecutive pixels. Then, a new parabolic interpolation is performed on the three pixels nearest the minimum of the parabola previously found. The process ends when the minimum of the parabola is comprised in the window defined by the three investigated pixels. Such a calculation method increases the convergence of the optimization step. When a parabolic interpolation operation is not possible (that is when the parabola has a maximum instead of a minimum), the calculation of the value of $a_k(l+1)$ is performed using a gradient descent, which consists in successive comparisons of values of the cost function of consecutive pixels until a minimum of said cost function is reached.

Figure 4:
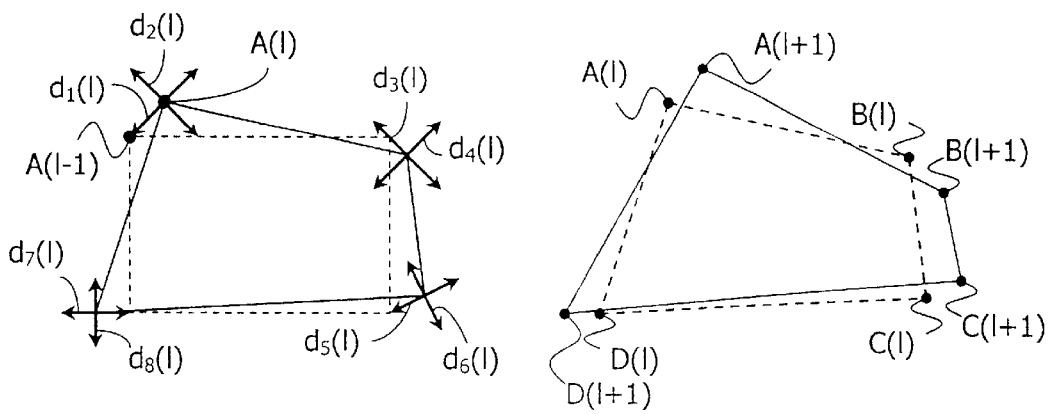
FIG. 4 shows a geometrical representation of the optimization step for the iteration (l+1)

When l=0, the directions followed by the eight parameters for minimizing the cost function are horizontal for abscissa or vertical for ordinates, as described in FIG. 1. When l≧1, the directions followed for optimization are reviewed given the last deformation, as described in FIG. 4. The optimization direction are defined as the direction $d_1(1)$ going from the vertex A(1−1) to the vertex A(1) and its perpendicular $d_2(1)$ and so on for the three other vertices.

Figure 5:
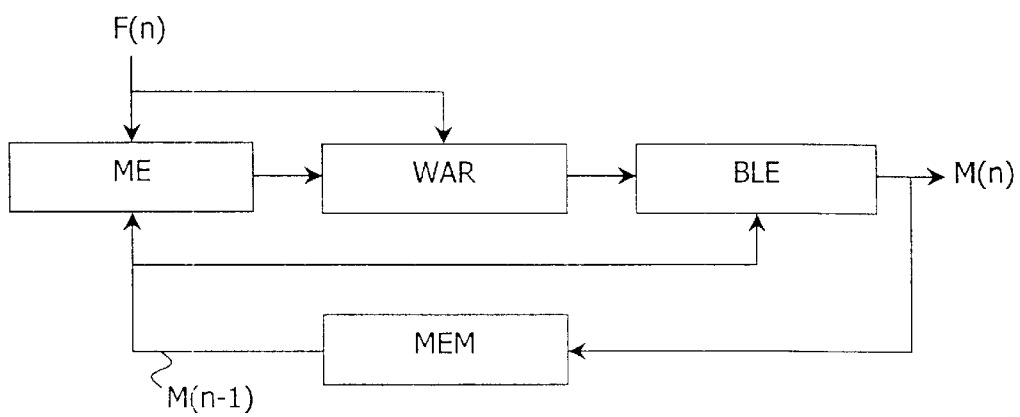
FIG. 5 shows a scheme of a large static image generation device.

This motion estimation method can be used in a method and its corresponding device for generating a large static image M(n), such as a sprite or a mosaic. Such a method is described in FIG. 5.

Three main steps may compose a large static image M(n) generation. First, the global motion estimation step (ME) according to the invention has to be performed in order to merge the incoming frame F(n) with the large static image M(n−1) already composed of the previous frames F(1), F(2), . . . , F(n−1). Said global motion estimation step (ME) gives the motion parameters $a_k$. The current frame is then compensated using the motion parameters; this second step is also called warping (WAR). The warped current frame F(n) is finally blended (BLE) with the large static image M(n−1) in order to form a new accreted large static image M(n) giving a panoramic view of the scene, which is stored in a memory (MEM) in order to be merged with the next incoming frame F(n+1), and so on.

What is claimed is:

1. A method for estimating motion between an incoming frame F(n) of a sequence of frames and a large static image M(n−1), said large static image being constructed from previous frames F(1) . . . F(n−1) of said sequence, said motion estimation method using a motion model based on a two-dimensional perspective transform containing eight motion parameters and comprising an optimization step of a cost function, characterized in that said eight motion parameters are the coordinates of the four vertices of the incoming frame, said vertices being successively moved in two directions to find an estimation of the motion parameters corresponding to an optimum of the cost function, wherein the cost function is defined by $$\sum_p \frac{1}{2} w_p r_p^2$$

where $r_p$ is a difference between original and predicted values of a pixel p and $w_p$ is a weighting coefficient.

2. A motion estimation method according to claim 1, characterized in that the weighting coefficient $w_p$ is a function of the inverse of $r_p$ and the derivative of $\rho(r_p)$ where $\rho$ is a symmetric, positive-definite function with a unique maximum at $r_p=0$.

3. A method for estimating motion between an incoming frame F(n) of a sequence of frames and a large static image M(n−1), said large static image being constructed from previous frames F(1) . . . F(n−1) of said sequence, said motion estimation method using a motion model based on a two-dimensional perspective transform containing eight motion parameters and comprising an optimization step of a cost function, characterized in that said eight motion parameters are the coordinates of the four vertices of the incoming frame, said vertices being successively moved in two directions to find an estimation of the motion parameters corresponding to an optimum of the cost function, wherein the cost function is defined by $$cost(r_p) = \frac{\sum_{p/(grad_p \geq T)} w_p r_p^2}{\sum_{p/(grad_p \geq T)} w_p}$$

where $r_p$ is a difference between original and predicted values of a pixel p, T is a threshold and $w_p$ is a weighting coefficient.

4. A motion estimation method as claimed in claim 3, characterized in that the weighting coefficient $w_p$ is defined by $$w_p = \frac{2}{2 + \frac{r_p^2}{1 + grad_p^2 \sigma^2}}$$

where $grad_p$ is a gradient of a pixel p and $\sigma$ is a scale factor.

5. A method for estimating motion between an incoming frame F(n) of a sequence of frames and a large static image M(n−1), said large static image being constructed from previous frames F(1) . . . F(n−1) of said sequence, said motion estimation method using a motion model based on a two-dimensional perspective transform containing eight motion parameters and comprising an optimization step of a cost function, characterized in that said eight motion parameters are the coordinates of the four vertices of the incoming frame, said vertices being successively moved in two directions to find an estimation of the motion parameters corresponding to an optimum of the cost function, wherein said motion estimation method includes a step of automatic initialization of said motion parameters for the two first frames using a two-dimensional translation transform.

6. A motion estimation method as claimed in claim 1, characterized in that said motion estimation method includes a first iterative method that comprises, at each iteration, said optimization step to determine an estimation of the eight motion parameters, followed by a step of calculation of the two directions of motion of each of the four vertices by taking into account the last deformation, said iterative method being performed until a defined criteria is reached.

7. A motion estimation method as claimed in claim 6, characterized in that said optimization step comprises a second iterative method performing, at each iteration, a parabolic interpolation operation of values of said cost function to estimate successively the motion parameters.

8. A method for generating a large static image M(n), such as a sprite or a mosaic, comprising a method for estimating motion according to claim 1.

9. A device for generating a large static image M(n), such as a sprite or a mosaic, comprising a motion estimation circuit implementing a motion estimation method according to claim 1.

* * * * *